(12) United States Patent
Weddingfeld et al.

(10) Patent No.: US 8,515,563 B2
(45) Date of Patent: Aug. 20, 2013

(54) SAFETY CONTROLLER (75) Inventors: Klaus Weddingfeld, Waldkirch (DE); Oliver Koepcke, Neuenburg (DE)

(73) Assignee: Sick AG, Waldkirch (DE)

( * ) Notice: Subject to any disclaimer, the term of this patent is extended or adjusted under 35 U.S.C. 154(b) by 300 days.

(21) Appl. No.: 12/909,101

(22) Filed: Oct. 21, 2010

(65) Prior Publication Data
US 2011/0098829 A1   Apr. 28, 2011

(30) Foreign Application Priority Data
Oct. 23, 2009  (EP) .................................... 09173908

(51) Int. Cl.
*G05B 9/02*       (2006.01)
(52) U.S. Cl.
USPC ........... 700/79; 700/2; 700/21; 700/4; 700/81
(58) Field of Classification Search
None
See application file for complete search history.

(56) References Cited

U.S. PATENT DOCUMENTS

| | | | |
|---|---|---|---|
| 6,532,508 B2 * | 3/2003 | Heckel et al. | 710/110 |
| 6,549,034 B1 | 4/2003 | Pietrzyk et al. | |
| 6,853,292 B1 * | 2/2005 | Kramer et al. | 340/3.43 |
| 6,871,240 B2 * | 3/2005 | Rupp et al. | 710/8 |
| 6,957,115 B1 * | 10/2005 | Meyer-Grafe et al. | 700/108 |
| 6,975,966 B2 * | 12/2005 | Scott et al. | 702/183 |
| 6,999,824 B2 * | 2/2006 | Glanzer et al. | 700/18 |
| 7,076,311 B2 * | 7/2006 | Schuster | 700/21 |
| 7,617,412 B2 * | 11/2009 | Shelvik et al. | 714/12 |
| 7,912,563 B2 * | 3/2011 | Oosako | 700/79 |
| 8,055,814 B2 * | 11/2011 | Sichner et al. | 710/38 |

(Continued)

FOREIGN PATENT DOCUMENTS

| | | |
|---|---|---|
| DE | 4108969 A1 | 9/1992 |
| DE | 197 50 470 A1 | 6/1999 |

(Continued)

OTHER PUBLICATIONS

European Search Report issued Feb. 19, 2010, in priority European Application No. 09 173 908.6, nine (9) pages.

(Continued)

*Primary Examiner* — Kavita Padmanabhan
*Assistant Examiner* — Christopher E Everett
(74) *Attorney, Agent, or Firm* — Nath, Goldberg & Meyer; Jerald L. Meyer; Scott C. Langford (57) ABSTRACT

A safety controller (10) having at least one input (18) for the connection of a sensor (20), at least one output (22) for the connection of an actuator (24), at least one communication interface (30) for the connection of a further safety controller (10*a-d*), to exchange control relevant information as well as having and also having a control unit (14) is provided which is configured to carry out a control program which generates a control signal at the outputs (22) in accordance with predeterminable logic rules in dependence on input signals at the inputs (18) and/or in dependence on the control relevant information. In this respect the communication interface (30) is configured for the connection of safety controllers (10*a-e*) in a line arrangement, in which each safety controller (10*a-e*) has a neighboring safety controller (10*a-e*) arranged as a predecessor and/or a neighboring safety controller (10*a-e*) arranged as a successor, and the logic rules process control relevant information of a connected predecessor and/or a connected successor and communicate the so determined control signals as control relevant information to a connected predecessor and/or a connected successor.

18 Claims, 9 Drawing Sheets

(56) References Cited

U.S. PATENT DOCUMENTS

| | | | |
|---|---|---|---|
| 8,144,718 B2* | 3/2012 | Schwenkel et al. | 370/408 |
| 2004/0215354 A1* | 10/2004 | Nakamura et al. | 700/21 |
| 2005/0010332 A1* | 1/2005 | Abe et al. | 700/245 |
| 2005/0114577 A1* | 5/2005 | Beckhoff et al. | 710/110 |
| 2007/0043877 A1* | 2/2007 | Seiler | 709/246 |
| 2009/0222107 A1* | 9/2009 | Moddemann et al. | 700/21 |

FOREIGN PATENT DOCUMENTS

| | | |
|---|---|---|
| DE | 19927635 A1 | 1/2001 |
| DE | 19718284 C2 | 9/2001 |
| DE | 10026923 A1 | 2/2002 |
| DE | 10248456 A1 | 6/2003 |
| DE | 10330916 A1 | 2/2005 |
| DE | 102007046178 A1 | 4/2009 |
| EP | 1 493 960 A2 | 1/2005 |
| EP | 1 936 457 A1 | 6/2008 |
| WO | 2006/069691 A1 | 7/2006 |
| WO | 2007093427 A1 | 8/2007 |
| WO | 2007/110953 A1 | 10/2007 |

OTHER PUBLICATIONS

Examination Report issued Jun. 4, 2010, in priority European Application No. 09 173 908.6, seven (7) pages.

"Handbuch," Wieland Elektrische Verbindungen, Jun. 2008, seventy-eight (78) pages.

"Samos SW-Design," Schleicher, Apr. 2006, SW-Design.doc, ninety (90) pages.

* cited by examiner

SAFETY CONTROLLER

The invention relates to a safety controller, having a communication interface for the connection of a further safety controller arranged downstream and a further safety controller arranged upstream in a line arrangement in accordance with the preamble of claim 1 as well as to a method for the design or changing of an alignment of safety controllers in accordance with the preamble of claim 14.

Safety controllers inter alia serve to react fault-free in a predetermined manner on application of a danger signal. A typical application of the safety technology is the safeguarding of dangerous machines, such as presses or robots which have to be shutdown instantaneously or be safeguarded instantaneously, when operating staff approaches in a non-allowed manner. For this reason a sensor, such as a light grid or a safety camera is provided which recognizes the approach. If such recognizes a danger then a safety controller connected to the sensor must absolutely reliably generate a shut-down signal.

In practice generally not a single sensor monitors a single machine, but a whole series of a danger sources have to be monitored. The corresponding number of associated sensors which can each define a switching event and suitable measures for the removal of dangers must then be configured in a safety controller and switched therewith. The programming of the safety controller can be supported by professional graphical programming interfaces, but requires in-depth knowledge, in particular because each error in the safety controller leads to the endangerment of people. The norm IEC 61131 for programming of control systems describes in IEC 61131-3 the graphical programming by means of functional components as well as an input/output interface description in physical technical values in IEC 61131-2. The configuration of the input switching and output switching and their interfaces to sensors and to actuators are, however, not standardized.

The machine concepts utilized in practice today are becoming more and more modular and allow a number of options. Modularity, on the one hand, means that the safety controller itself is modularly extendable so that it can be matched to changes and supplements in the connected sensors or actuators. On the other hand, also a plurality of safety controllers are connected to one another in a network. This makes sense e.g. when a respective safety controller is responsible for a machine or a component part. In many applications e.g. in process chains in which the machines carry out subsequent processing steps at the respective intermediate product of the previous machine a very simple network topology of the safety controllers in the form of a line arrangement is sufficient.

In such networked safety controllers a large part of the control functionality may be may be respectively related locally to the associated machine. Simultaneously, it emits signals, e.g. an emergency stop which the safety controllers have to communication between one another. For this reason emergency stops used to previously be connected at the individual machines in a series connection. Then the activation of an emergency stop at anyone of the machines instantaneously leads to the stand-still of the complete plant. On extension of the plant additional emergency stops were then simply added to the series connection.

In common safety controller concepts such a simple change of the plant is no longer possible today. The safety controllers typically communicate using process images, in which for each monitored machine and/or their safety controller a respective bit block and/or data region is reserved. If the set-up of the plant is changed in that machines are added, removed or exchanged, then the control programs matched to the current image are no longer valid for the safety controllers connected in the network and they require a reprogramming and a subsequent renewed commissioning which only correspondingly trained staff can carry out. If one were to add a safety controller to the network, remove one therefrom or rearrange the safety controllers then without reprogramming the network would count as malfunctioning so that the release for operation would be denied for safety technological reasons.

A further large disadvantage of the current solutions lies therein that in the process image a further data region has to be reserved for each additional safety controller. To remain in the example of an emergency stop switch for every machine a respective bit region and/or data region has to be available for their emergency stop switch. Each plant extension therefore requires additional bits for the process image. However, as the bit width of the process represents a very scarce resource extensions in this manner are only possible in a very restricted manner.

Although the safety controllers in such modular plants can also work in a self-sufficient manner, to a large extent due to the dependence in the complete plant a matching of the control programs of the safety controllers is conventionally required when the plant is changed e.g. by rearranging adding or removing plant components. This is not just a huge demand in cost and time, but it also requires a qualified and for this reason error-prone programming or at least the selection of the control programs for the specific application by a control expert. The conventional solutions are thus both demanding in time and cost as well as inflexible.

EP 1 936 457 A1 discloses a modular safety switching apparatus in which at least one output module is provided which has an internal logic. In an embodiment, a plurality of such output modules then exchange intermediate results of the evaluation with one another for a divided or redundant evaluation or exchange these with a central control of the safety switching apparatus. However, the disadvantage that changes of the intelligent exchange module have to be matched to the control program is not overcome thereby. This common solution also does not offer an approach to solve the problem of a limited process image.

From EP 1 493 960 A2 a safety relay system is known which includes sections for the processing of secure and insecure information. In this respect a plurality of input units and output units can be connected to a head of the system.

In WO 2007/110953 A1 a programming interface for a controller part is put forward which includes a plurality of stations. These stations are networked amongst one another using a field protocol.

U.S. Pat. No. 6,549,034 B1 describes a programmable safety controller having reduced cross-connections.

It is therefore an object of the invention to provide a simple and secure possibility of matching a network safety controller to changes in the plant. This object is satisfied by a safety controller in accordance with claim 1 and a method for the design or change of a line arrangement of safety controllers in accordance with claim 14. In this respect, the solution in accordance with the invention starts from the basic idea that each individual safety controller in a network of safety controllers is configured independently functional and optionally incorporates reactions to predecessors and/or successors in the line arrangement of a plurality of network safety controllers. The safety controllers in such a networked line function work independent of the specific sequence, the type and the number of safety controllers switched in series. The safety controllers work in a self-sufficient manner, there is no central super-ordinate instance which bundles or coordinates the communication and the logic evaluation.

All safety controller connectable to a line arrangement know the overall global process image in advance. This unchangeable process image is therefore also not modified on adaptation of the plant and the associated safety controllers. Each individual safety controller can access the common global bits of the process image of the line arrangement communicated from point to point, process these and forward these changed or unchanged. Thereby a uniform significance of the data regions of the process image occurs.

The invention has the advantage that changes in the plant set-up are possible through a simple replugging which does not require any expert knowledge so that also no qualified commissioning has to occur. For this reason a high flexibility and a very fast and simple possibility arises to change the plant which still includes the fully functional safety controller. Moreover, an arbitrarily long line arrangement is possible without the required process image width increasing.

In a line arrangement each participating safety controller has exactly one predecessor and exactly one successor. Exceptions are given by the two safety controllers at the beginning and the end of the line arrangement to which no predecessor respectively no successor is connected. A ring structure is not provided in accordance with the invention, as coupling effects can occur in this respect. The safety controllers thus do not form a network in the sense of free communication between all participants. The serial connection in the line arrangement initially only allows a point-to-point communication between neighbors. In additional communication cycles, however, information can also be forwarded from neighbor to neighbor and thus arrive at the overall line arrangement.

The control relevant information is preferably at least parts of a predefined process image of the safety controller in the overall line arrangement in the safety controller independent of the line arrangement. As the required band width is relatively small in practice, even more preferably, the total process image is transferred. In the process image e.g. states of single or all inputs and/or outputs can be represented as bit values. Intermediate results of the logic can also be stored as simple bit values, e.g. to combine multi-channel connections or also to bundle complex evaluations independent thereof how complex the sensors and the logic is which lead to this result. The process image is defined for the plant and independent of the number of stations or alternatively the number of safety controllers which form the line arrangement. Each part of information in this process image corresponds to a defined function. In all participating safety controllers an agreement already exists in advance prior to the combination to a line arrangement.

The exchangeable control relevant information relate preferably to safety paths, in particular emergency stop signals or restart signals. In a conventional network of safety controllers a data region and/or a bit region of each safety controller must be provided for such a safety relevant function. In accordance with the invention a single bit region is sufficient alternatively only one bit is sufficient to realize the function of an arbitrary number of involved safety controllers.

The safety controllers preferably have a memory in which values for the control relevant information is stored, in particular for at least a part of the predefined image, with the control unit being adapted to use the predefined information as the control relevant information of a non-connected predecessor and/or successor. This predefined default process image is used by the safety controllers at the beginning and at the end of the line arrangement where there is no predecessor or no successor. The predefined values correspond advantageously to states of undisturbed operation so that the safety controllers at the ends of the line arrangement effectively work as if both neighbors were present. The logic in all safety controllers can forgo a case discrimination for the position within the line arrangement because of the predefined values. If no successor nor a predecessor is connected then the safety controller concerned may not be connected in a network, but be completely isolated and self-sufficient. Because of the predefined values it, however, still works meaningfully also in this configuration.

The control program preferably has a set of logic rules to generate control relevant information for the overall line arrangement, to process it and to forward it. This does not mean the information is communicated directly to the overall network, but that it is forwarded step by step through the line arrangement. Thus, information relevant for the complete plant e.g. an emergency stop or a restart reaches all safety controllers. Through the provision of logic rules on programming of the safety controller one does not have to consider how messages are correctly processed and communicated both internally.

The control program preferably has a respective set of logic rules to generate control relevant information for the successor and/or the predecessor, to process it and to forward it. Such information must not be communicated to the complete plant, but only relates to one or both direct neighbors.

The control program preferably has a respective set of logic rules for bits of the control relevant information which is coded normally and coded inverted. Normal coding as is generally known in digital technology means that a current-free or potential-free line corresponds to a logical zero and a line impinged with a current and/or potential corresponds to a logical one ("Default Low"). In inverted coding it is exactly the opposite ("Default High"). This coding is frequently used in safety technology, e.g. for the connection of an emergency stop, as in normal coding the transfer of a logical zero would not be distinguishable from a line defect. Non-safety critical signals such as a restart are by contrast also coded normally.

The communication interface is preferably configured for a secure communication. The control relevant information which is exchanged via the communication interface is generally implemented in the logic rules of the safety controller and for this reason safety critical. A possibility for a secure communication is the use of a known bus standard, such as CAN or profibus which is further qualified by an additional safety protocol or by a redundant additional line.

The safety controller is preferably configured modularly and has at least one connection module having the inputs and/or the outputs, wherein a first connection module is connected to the control unit and the further connection modules are each connected to only a connection module arranged upstream so that the control unit forms a module series with the connection modules. The modular set-up of the individual safety controllers enables flexible matching in the sensors and the actuators of those machines or those machine parts which are monitored by the safety controller.

Advantageously, the control unit forms a control module and both the connection modules and also the control modules are each arranged in a housing which compared to one another have at least a few dimensions of identical outer geometries, wherein each connection module has a connection for a module arranged upstream and a connection for a module arranged downstream in the module series. In this manner module series can be set-up clearly and with a plannable space requirement. The outer geometry of the control module can specifically deviate from that of the connection modules to make it more visible and to create space for the increased demand in electronics. This deviation must however not relate to all dimensions, so that for example the control module has the same width and depth as the control module but a deviating height.

In a preferred embodiment a line arrangement is provided with a plurality of safety controllers in accordance with the invention, wherein each safety controller of the line arrangement is connected via the communication interface with its predecessor and with its successor. The line arrangement is therefore double-chained and enables a communication from back to front as well as from front to back. In a simple chain the missing inputs at the ends of the line arrangement can lead to erroneous behavior, such as e.g. to the release of a plant and the restart of the plant following an emergency stop. Naturally, the two safety controllers at the ends of the line arrangement are relieved of the requirement that they have both a predecessor and also a successor. Because of the respectively lacking predecessor or successor the communication line is connected electrically.

The control units of the safety controllers are preferably configured to process a teach-broadcast-signal so that the safety controllers affiliate themselves with one another on activation of the line arrangement, allocate addresses and determine whether a predecessor and/or a successor is connected. A teach-broadcast, i.e. a teaching message to all participants thus initiates the network set-up. If a safety controller does not find a predecessor then it identifies itself as the beginning of the line arrangement and correspondingly as the end of the line arrangement when no successor is identified. These safety controllers advantageously use the predefined information for the lacking communication from the non-connected safety controller.

The control programs of the individual safety controllers of the arrangement preferably compare with one another, in particular on activation of the safety controller whether all safety controllers of the line arrangement are in agreement on the significance of the exchangeable control relevant information, in particular whether they are synchronized to the same predefined process image and/or whether the same predefined information is stored in all safety controllers. Activation is hereby understood to be the switching on and/or booting up of the plant. A commissioning is a special activation in which a new or a changed plant is switched on for the first time. Commissioning typically requires specifically qualified staff and in accordance with the invention is not necessarily required when the network configuration of the safety controllers is changed. In accordance with this embodiment, an activation should be examined to see whether the safety controller cooperates usefully in the specifically realized line arrangement. For this purpose the consensus over the used global process image and the predefined values for use at the end of the line arrangement are required. The comparison occurs e.g. by means of a network identification number which codes or determines whether all connected safety controllers are even suited for a line arrangement and which determines which global process image they use and/or which predefined values they use.

The control program of the individual safety controllers of the arrangement preferably compare with one another, in particular on activation of the safety control whether they are connected safety controllers of the line arrangement which are connected as predecessors and/or as successors and if they correspond to the stored safety controllers. Also when changes in the arrangement of the safety controllers are supported in accordance with the invention this is not allowed to occur randomly and at arbitrary times. An exchange during the running operation in a safety technical application would be evaluated as a failure and lead to a safety directed reaction. But also on activation it has to be recognized whether the changed network configuration is desired or e.g. the result of a defect or an accidental separation of connecting lines. Therefore each control unit stores, in particular in accordance with a teach-broadcast, which predecessor and which successor was last connected, e.g. by means of a type identification number or an individual safety identification number. In contrast thereto a changed network configuration leads either directly to a refusal of the release of the plant or a corresponding authorized acceptance of a qualified handling staff is required.

The method in accordance with the invention can be furthered in a similar manner and in this respect has similar advantages. Such advantageous features are exemplary described, but not in their entirety in the claims dependent on the independent claims. In accordance with the method in accordance with the invention safety controllers can be connected in a desired sequence line-wise, be changed in their sequence and/or safety controllers can be removed or added. In this way the networked arrangement of the safety controllers can be flexibly matched to a plant structure.

The control program in the safety controller of the line arrangement preferably uses a predetermined uniform global process image in the safety controller (10a-e) and in each safety controller values for the process image are stored which are used by the control unit when the safety controller is connected at an end of the line arrangement without a predecessor or a successor. Inter alia, the uniform process image determines the bit number of process data and the global significance of the individual bits, even before the connection to a line arrangement in each safety control as is uniformly understood in all safety controllers connectable in the line arrangement. The global process image relates to plant-wise super-ordinate safety relevant functions of the individual safety controller, such as an emergency stop or a restart. The specific calculation within a safety control has local significance for the plant part monitored by the safety controller and is individually projected. From the local calculation also the manner and the type depends in which the values for the process image are communicated in the line arrangement. Thus, the safety controller can cooperate in an arbitrary arrangement within a line.

The invention will be described in detail in the following also with regard to further features and advantages exemplary by means of embodiments and with reference to the enclosed drawings. The images of the drawing show in:

FIG. 7a-f an exemplary signal progress of a global message;

FIG. 9a a graphical representation of the logic rules for the processing of a message to a successor in accordance with FIG. 8a;

FIG. 9c1 a graphical representation of the logic rules for the processing of a message to both neighbors in accordance with FIG. 8c with inverted coding;

FIG. 9c2 a graphical representation of the logic rules for the processing of a message to both neighbors in accordance with FIG. 8c for normal coding;

FIG. 9d1 a graphical representation of the logic rules for the processing of a message to the total line arrangement in accordance with FIG. 8d for inverted coding;

FIG. 9d2 a graphical representation of the logic rules for the processing of a message to the total line arrangement in accordance with FIG. 8d for normal coding;

Figure 10:
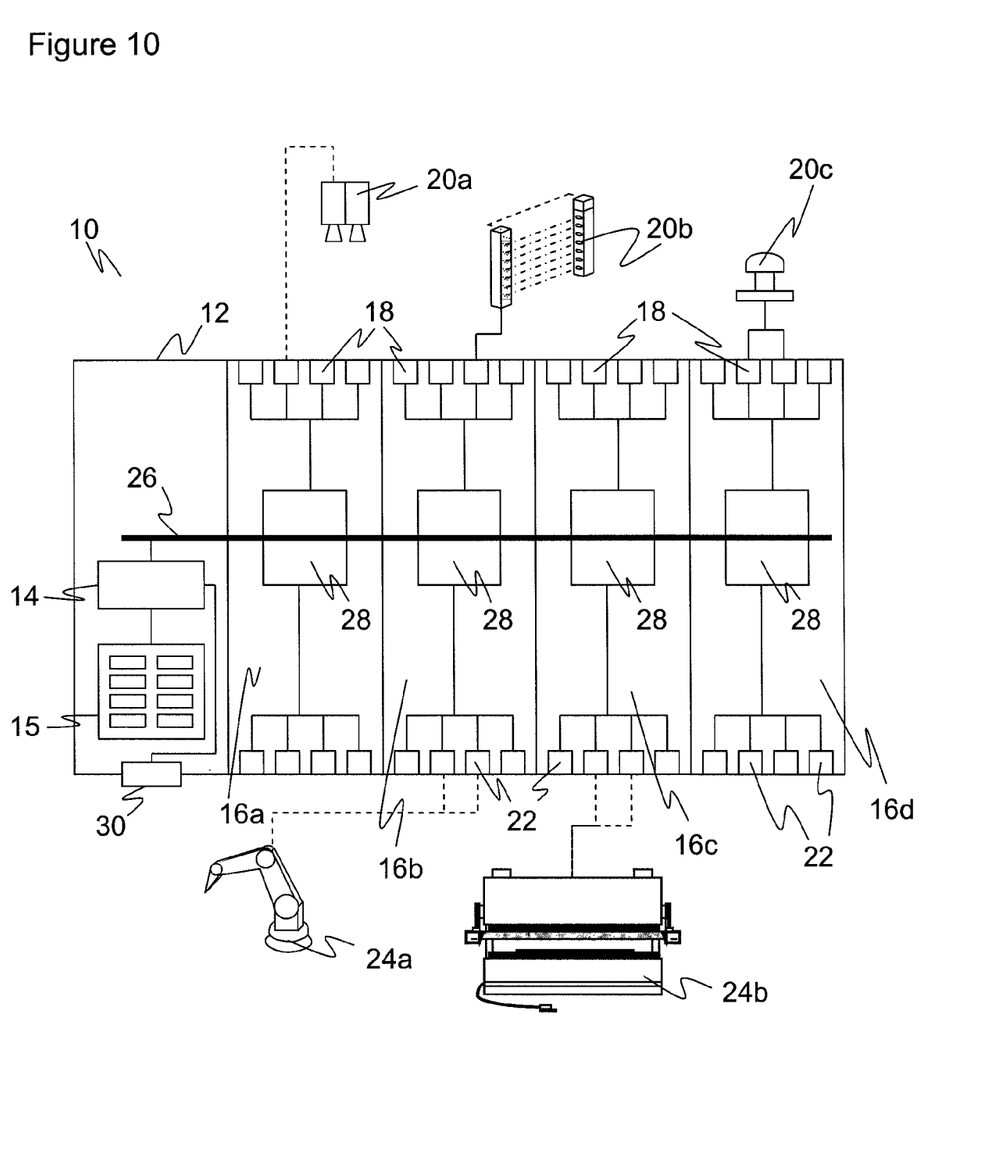
FIG. 10 an overview illustration of an exemplary plant having sensors and actuators and their connections to a modular safety controller.

FIG. 10 shows a modular safety controller 10 having a control module 12 which has a further control unit 14, i.e. e.g. a micro-processor or a different logic component. In the control module 12 a memory region 15 is provided in which one or more predefined process images are stored and which the control unit 14 can access as is described below in detail with reference to FIGS. 3 to 6.

Four connection modules 16a-d are sequentially connected with the control module 12. In the connection modules 16a-d inputs 18 for the connection with sensors 20a-c and outputs 22 for the connection with actuators 24a-b are provided. In contrast to the illustration the connection modules 16a-d can be different in the type and the number of their connections and only have inputs, only have outputs as well as a mixture of both also with a respective different number of connections. Also the arrangement and the physical construction of the connection clamps 18, 22 is matchable to the plug types, cable sizes and signal types through the choice of a certain connection module 16. Finally, the modules 12, 16a-d are illustrated in simplified manner and can include further elements, e.g. an LED for each connection in a clear arrangement highlighting the association optically.

The safety controller 10 has the task to ensure a safe operation of the sensors 20a-c and in particular the actuators 24a-b, i.e. to shut-down the actuators 24a-b safety related (the output 22 is then an OSSD, Output Switching Signal Device), to safely carry out an emergency stop of the plant, to accept an arbitrary control of an actuator 24a-b, in particular on switching on or on a reboot and to release actuators 24a-b and the such like.

A light grid 20b, a safety camera 20a and a switch 20c are examples of safety relevant sensors or inputs which can deliver a signal in response to which a safety related switch-off occurs. This can be an interruption of the light beam of the light grid 20b by a body part, the recognition of an unallowed intrusion into a safety region by the safety camera 20a or an operation of the switch 20c. At the inputs 18 further safety sensors of arbitrary type such as a laser scanner, 3D cameras, switching maps or capacitor sensors can be connected, but also other sensors e.g. for the reception of measurement data or simple switches such as an emergency stop switch can be connected. All such signal emitters are referred to here in the following as sensors.

In certain applications also sensors 20 are connected to outputs 22 and actuators 24 are connected to inputs 18, e.g. to transfer test signals, to temporarily switch a sensor 20 mute (muting), blank out partial regions from the monitored region of the sensor 20 (blanking) or because an actuator 24 also has individual signal outputs besides an input for control with which it monitors itself partially.

Preferably a robot 24a and a folding press 24b are connected to the outputs 22 in a two-channeled manner, these represent examples of dangerous actions on non-allowed insertions of operating staff. These actuators 24a-b can thus obtain a shutdown command from the safety controller 10 to switch these off on recognition of a danger or an unallowed insertion by safety sensors 20a-b or to convey this into safe state. In this respect the light grid 20a can serve for the monitoring of the folding press 24a and the safety camera 20b can serve for the monitoring of the robot 24b so that sensors 20a-b and actuators 24a-b associated with one another functionally can also be connected respectively at a module 16a and/or 16b. The functional association thereby, however, occurs via the control unit 14 so that such an image of the plant may be clear, however, it is in no way required. Further actuators than those actuators 24a-b represented are feasible and indeed such which generate a danger region and also others such as a warning lamp, a siren and a display and such like.

A back plane known as a serial communication connection 26 is arranged between the control unit 14 and the input 18 and/or the outputs 22 which in particular is a back wall bus and additionally can be configured as failure safe. As an alternative to a bus also a direct connection, a parallel connection or a different connection 26 can be provided which communicate amounts of data at the required switching times. The modules 16a-d have an individual controller 28 to participate with the bus communications. For this a microprocessor, an FPGA, an ASIC, a programmable logic or a similar digital component can be provided. The controllers 28 can also take over evaluation tasks or together with the control unit 14 carry out distributed evaluations which range from a simple Boolean link up to a complex evaluation such as for a three-dimensional safety camera.

The modules 12, 16a-d are each arranged in uniform housings and are connected with one another mechanically and electrically by connection parts. The control module 12 thus forms a head of a module series. Safety controller 14, inputs 18, outputs 22 and bus 26 are configured failsafe, i.e. by measures such as two-channeled design, by diverse, redundant, self-examining or any other safe evaluations and self-tests. Corresponding safety requirements for the safety controller are determined in the norm EN 954-1 and/or ISO 13849 (performance level). The possible safety level and the further safety requirements of an application are thus defined in the norm EN 61508 and/or EN 62061.

The configuration and programming of the safety controller 10 occur in practice using a graphical user interface with whose aid a control program is generated and subsequently loaded.

In accordance with the invention it is provided to combine a plurality of safety controllers 10 of the described type to a line arrangement. For this the control module 12 has at least one interface 30 by which the safety controllers 10 communicate with one another.

Figure 1:
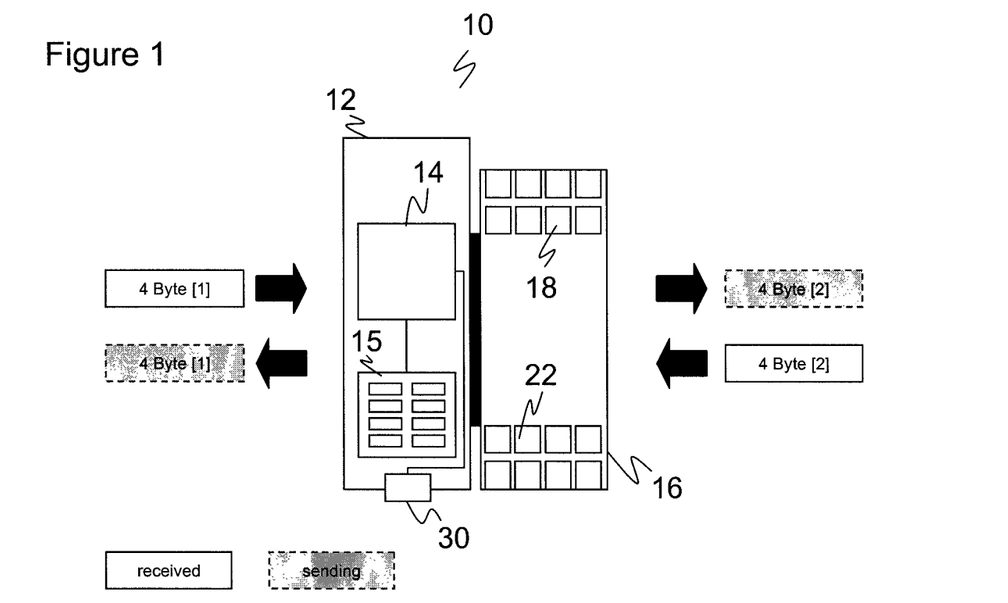
FIG. 1 a block illustration of a safety controller in accordance with the invention for connection in a line arrangement.

FIG. 1 shows a simplified block illustration of an individual safety controller 10 for the connection in a line arrangement. The safety controller 10 is in principle set-up as is described in FIG. 10. The number of connection modules 16 of inputs 18 of outputs 22 the type of the connected sensors 20 and actuators 24 as well as the evaluation logic is purely exemplary and in each safety controller 10 can be matched and varied according to the application. In the practical application a safety controller 10 is associated in a closed part of a modular plant, e.g. to an individual machine to monitor this part safety technologically. A safety controller 10 is illustrated in the Figures frequently simplified only having a connection module 16 which then merely serves as a symbol for the mentioned variant diversity.

The safety controller 10 is in a position to send and receive information from its predecessors and a successor connected to the safety controller via the interface 30. This is illustrated in FIG. 1 by arrows with the sending information and the receiving information. The interface 30 is simplified and only shown as a connection which in practice is designed as two-part to connect with the successor and with the predecessor or a corresponding doubled or multiplied regulated number of connecting lines.

The safety controller exchanges safety information with its predecessor and its successor via the interface 30. In the illustrated example of FIG. 1 these are effectively 4 bytes of process data. Naturally, deviating data widths are plausible.

Figure 2:
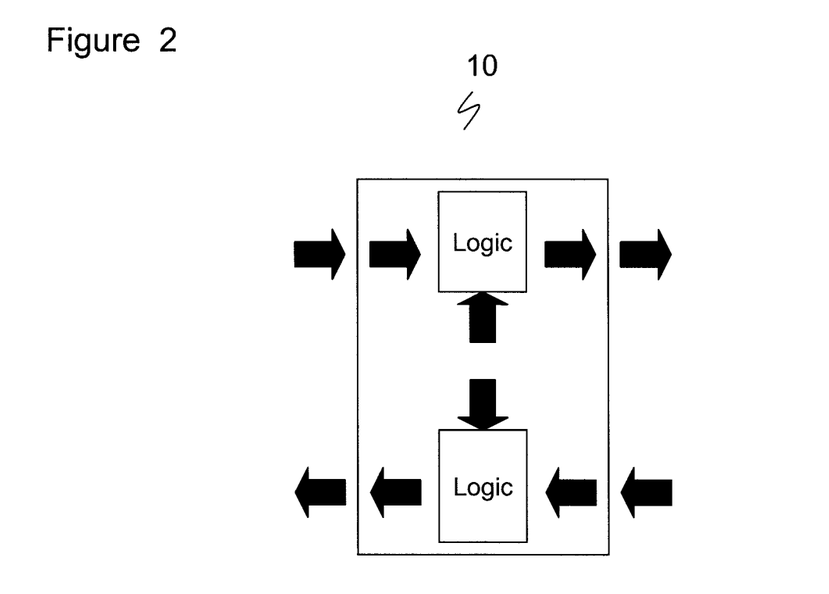
FIG. 2 a schematic illustration of the control logic in the safety controller in accordance with FIG. 1.
Figure 3:
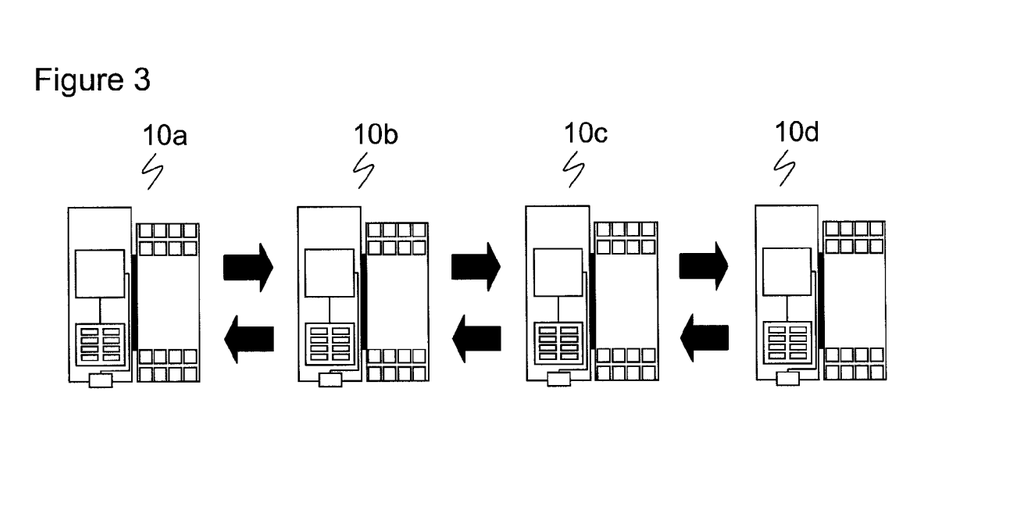
FIG. 3 a block illustration of a plurality of safety controllers in accordance with FIG. 1 to a combined line arrangement.

FIG. 2 schematically shows the logical flow in the safety controller 10 by means of arrows. The safety controller 10 receives signals from the upper path from a predecessor which are processed internally and forwarded in unchanged form or following the processing to a successor. On the lower path the same occurs in the inverse direction. In FIG. 3 four safety controllers 10a-d, each of the type, as they were described in relation to FIG. 1 and FIG. 10 are connected to a line arrangement. A uniform global processing image is obtained which is valid for the complete plant, i.e. for all safety controllers 10a-d. This global processing image is known to the participating safety controllers 10a-d in advance. Arbitrary machines or machine parts are designed and modularly processed in each of the safety controllers 10a-d with the global process image. In this respect local differences between the safety controllers 10a-d to safety controllers 10a-d are allowable in so far as they do not relate to the communication in the line arrangement, i.e. a plant-wide agreement on which significance the communicated bits of the global process image convey.

The safety controller 10 shown in FIG. 2 as a representative of the safety controllers 10a-d respectively receives the global process data from the predecessor indicated by the upper arrows in the forward channel and sends these unchanged to the successor or following internal processing, their own process data to the successor. Correspondingly, the safety controller 10 receives the global process data in a backward channel indicated by means of the lower arrows from the successor and sends these to the predecessor. Not all of the transferred information must be process data, e.g. also bits for protocol information, check sums or such like can be provided. The safety controller 10 respectively evaluates in its own logic the received uniform global processing image from the line arrangement processes it, correspondingly controls its own outputs and if necessary transmits its own information into the global process image which is communicated in every cycle from neighbor to neighbor stepwise in the line arrangement.

An important example for a non-local information to be communicated in the line arrangement is an emergency stop, which is initiated at a plant part and should stop the entire plant. The information on whether this emergency stop has been initiated is linked in advance to a certain bit of the communicated process data and consensus is present between all safety controllers 10a-d which can participate in a line arrangement. Each safety controller 10a-d using its logic rules then links not only the input signals to its own inputs 18, but also the emergency stop information received by the line arrangement. The emergency stop information can both be initiated in an individual safety controller 10a-d, for example because an emergency stop switch was pressed in an associated machine part and also be forwarded in the line arrangement, i.e. be communicated to the predecessor and/or the successor. Thus, the bits linked to the emergency stop are sufficient to stop all involved machines using the associated emergency stop switch of a machine. This communication saves resources in the processing image and is independent of the number of the participating emergency stop switches and/or machines. It also allows a simply insertion of further safety controllers 10 for processing additional emergency stop switches and machines, such as a pure series connection of simple switches or relays.

At the ends of the line arrangement, respectively a predecessor and/or a successor is missing. Correspondingly, also the arrows at the beginning and the end of a line arrangement are missing in FIG. 3. In all safety controllers 10a-d the predefined process data is stored in a memory region 15 in advance. If a safety controller 10a-d determines that no predecessor and/or successor is connected then this predefined process data is used. No dedicated head safety controller or end safety controller is therefore present; however, each safety controller 10a-d can take over this roll without changing the control program dynamically.

Figure 4:
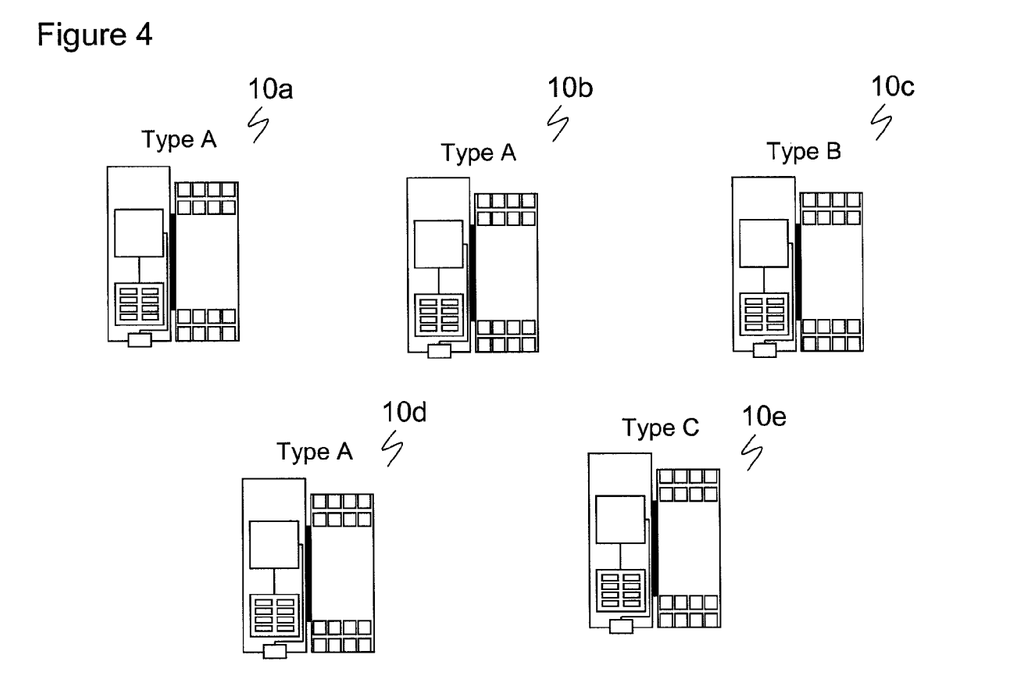
FIG. 4 a block illustration of a plurality of safety controllers in accordance with FIG. 1 prior to the connection to a line arrangement.

In the following it will be explained how safety controllers 10a-e can be connected to a line arrangement with reference to FIGS. 4 to 6. FIG. 4 initially exemplary shows a group of five safety controllers 10a-e. Each safety controller 10a-e carries in this example a type designation with which it is determined which type of machine the safety controllers monitors. The group of safety controllers 10a-e is initially not connected and still does not form a line arrangement.

Figure 5:
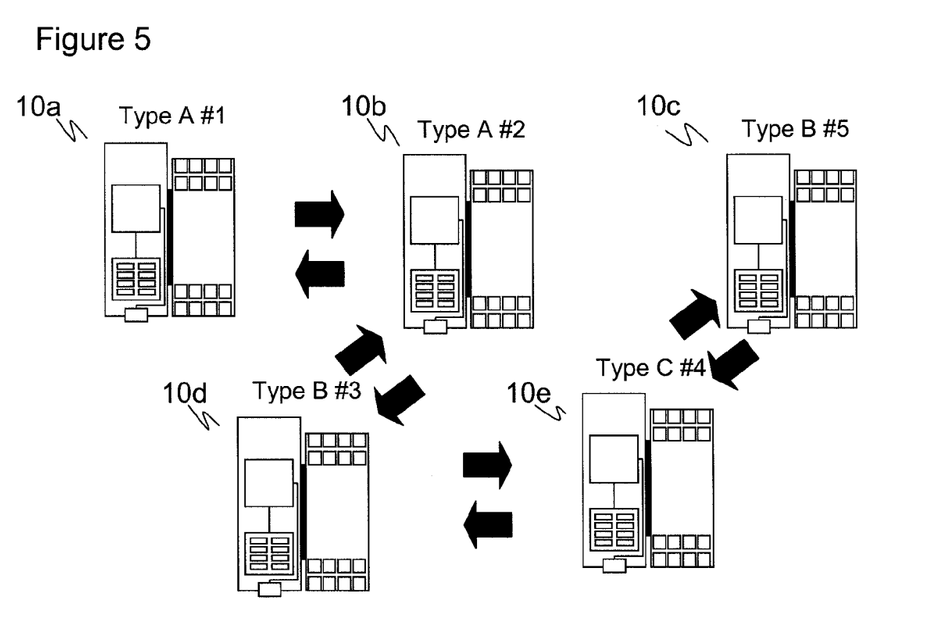
FIG. 5 a first exemplary chain of the safety controllers in accordance with FIG. 4 connected to a line arrangement in accordance with the teach-broadcast.

In the configuration shown in FIG. 5 the safety controllers 10a, 10b, 10d, 10e, 10c are connected in this sequence to a line arrangement, which is also illustrated by the arrows. For the use as a safety technical application, an actuator mechanism subsequently occurs that the present configuration is wanted. For this purpose a corresponding qualified and authorized operating person, has to input a confirmation, e.g. with the aid of a key, an electronic card or a password. This initiates a teaching signal (teach-broadcast) at all participating safety controllers 10a-e in the line arrangement, whereupon the safety controllers 10a-e affiliate themselves with one another, assign addresses, which are shown here in the sequence as #1-#5. Each safety controller 10a-e thereafter knows their predecessor and their successor. If a predecessor or a successor is missing, then the corresponding safety controller 10a-e is at an end of the line arrangement and uses the predefined process data from the memory region 15, as is described above. The teach-broadcast-signal can be initiated by an arbitrary participating safety controller 10a-e.

Figure 6:
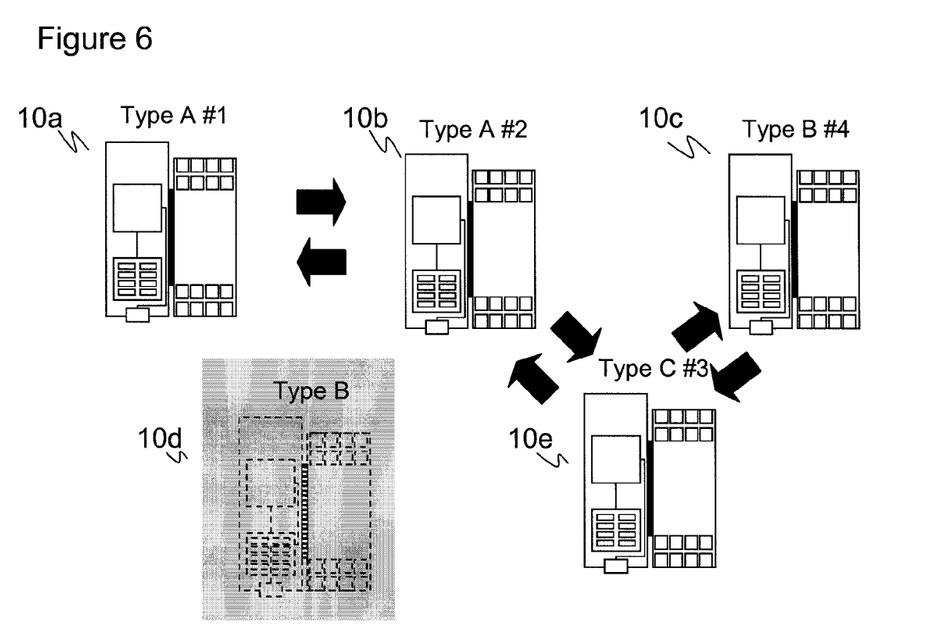
FIG. 6 a second exemplary chain of the safety controller in accordance with FIG. 4 connected to a line arrangement in accordance with the teach-broadcast.

In FIG. 6 the group of safety controllers 10a-e of FIG. 4 are connected to a different line arrangement than in FIG. 5. In this respect the safety controllers 10a, 10b, 10e, 10c form a line arrangement in this sequence while the safety controller 10d is not connected and for this reason is also not a part of the line arrangement. Thus, through a simple change of the connections in the line arrangement a matching to a change of the apparatus occurs in the plant for which machine associated with the safety controller 10d is removed, or deactivated. In analogous manner, arbitrary line arrangements can be constructed to react to changes in the plant.

The safety controller 10a-e test whether all safety controllers 10a-e are part of the line arrangement, e.g. by exchanging definite network identification number. Thus, it is ensured that the predefined process data and the global process image match one another. This test primarily takes place on startup of the plant. If a participant from a different network is recognized, for example with a deviating network identification number then the system does not start.

Each safety controller 10a-e saves its predecessor and its successor e.g. following a teach-broadcast. On ramping up of the plant, the connected predecessors and successors are compared to the stored ones. When all safety controllers 10a-e find their stored predecessors and successors, then the plant can be released.

If the safety controller 10a-e determines a change of its successor or its predecessor, i.e. a different neighbor, an additional neighbor or a missing neighbor, there can be two possible causes for this: An intended conversion of the plant or a defect. A targeted conversion is also processed following the actuation mechanism by a teach-broadcast and leads to a new line arrangement. If the required confirmation remains absent, then the release is denied.

Process information in the line arrangement is forwarded from the safety controller 10a-e to the safety controller 10a-e in a point-to-point communication. In this respect the participating safety controller obtains readable and writable access to the global process image. The distribution of information, however, lasts for a plurality of cycles, wherein their number depends on the length of the line arrangement.

In FIG. 7a-d FIG. 7 shows exemplary the forwarding of an information Info1, e.g. of a local emergency stop signal to all participating safety controllers 10a-c, as well as the subsequent release thereof in FIGS. 7e-f that the local emergency stop is no longer activated. In this respect the arrows respectively show the information, in particular the information bit, of whether the emergency stop is activated, with black arrows representing an activated emergency stop and white arrows representing a non-activated emergency stop. It should further be noted that a non-activated emergency stop is represented by a logical one in the safety technology. A logical AND link due to of this inverting corresponds to the intuitively expected OR.

Figure 7A:
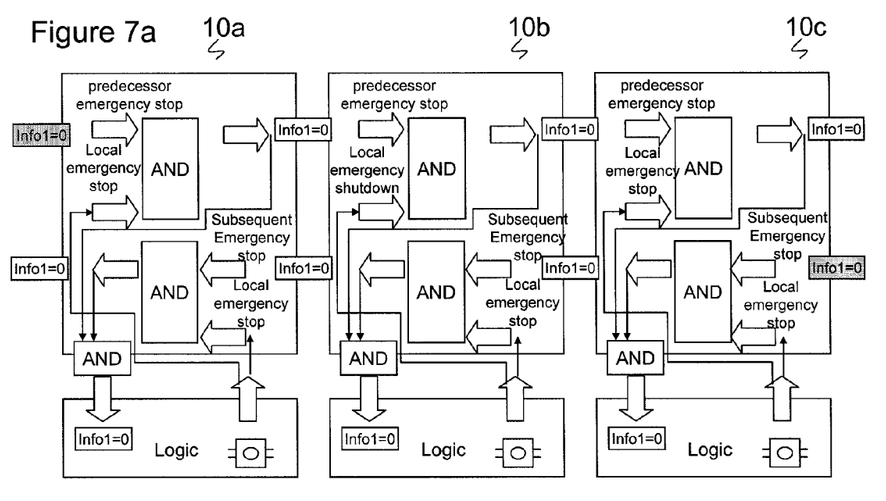
Figure 7B:
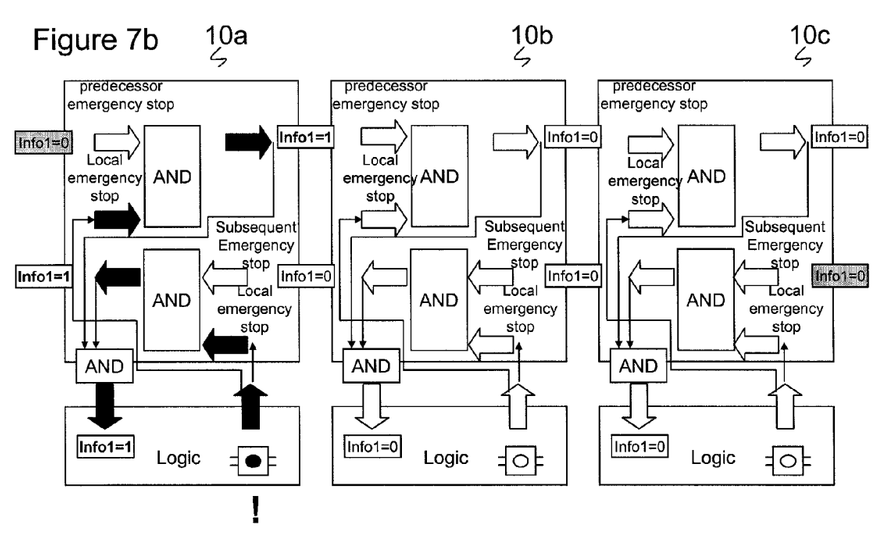
Figure 7C:
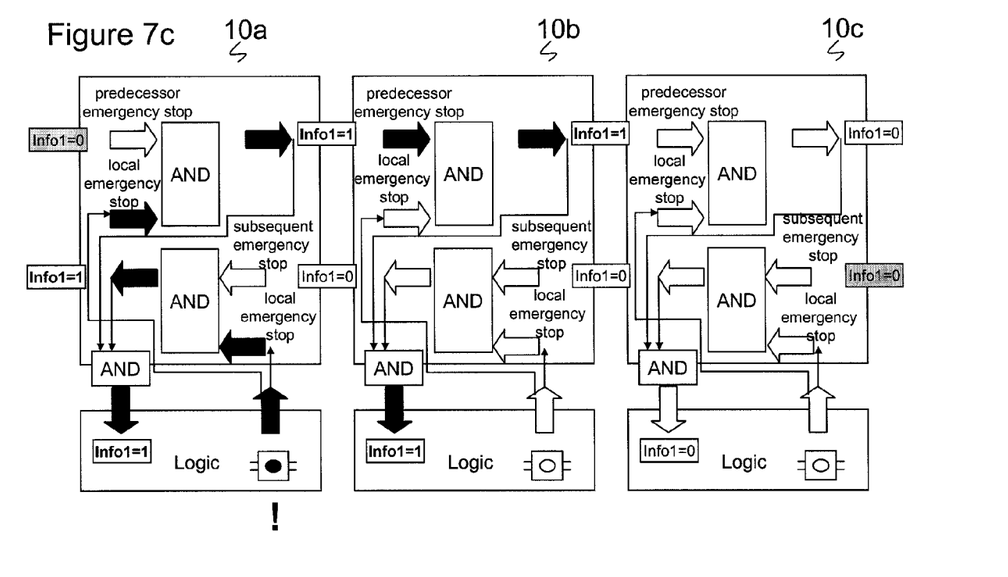
Figure 7D:
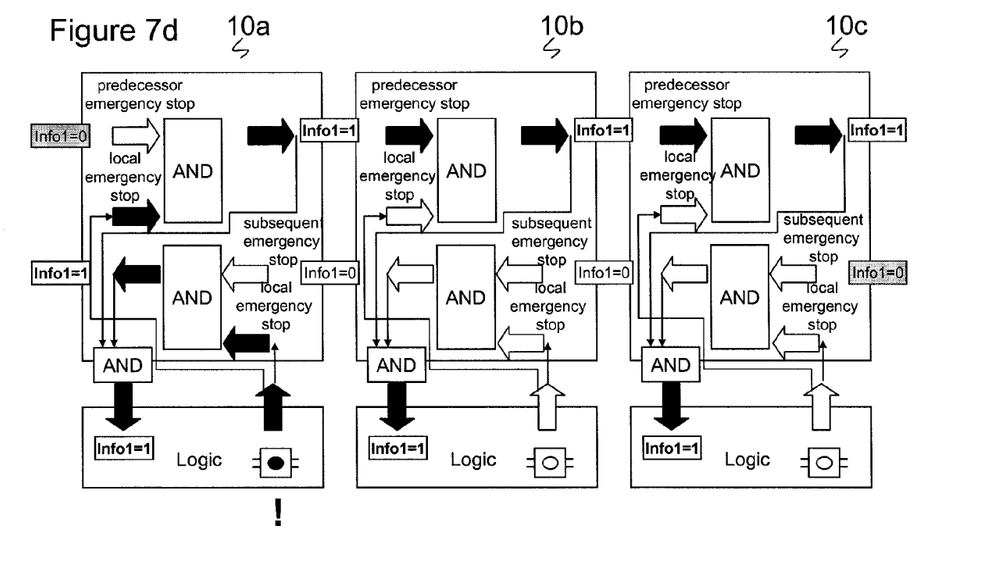
Figure 7E:
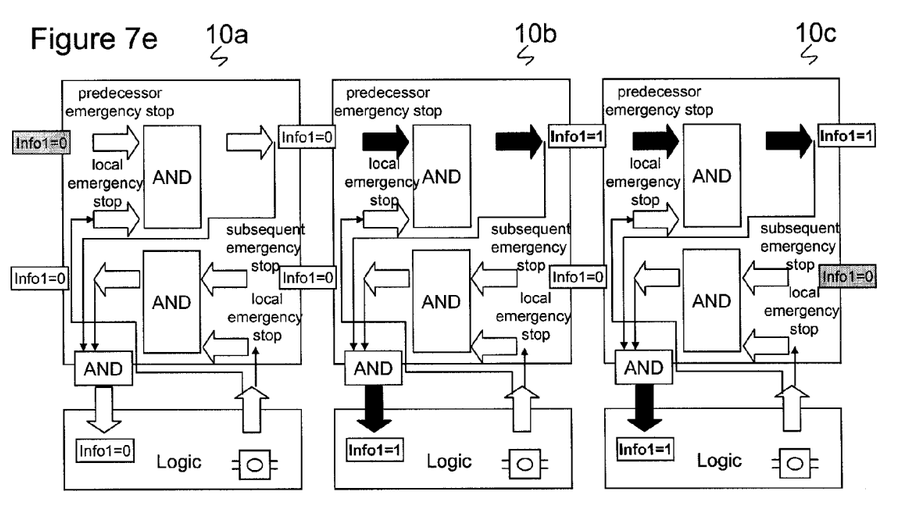
Figure 7F:
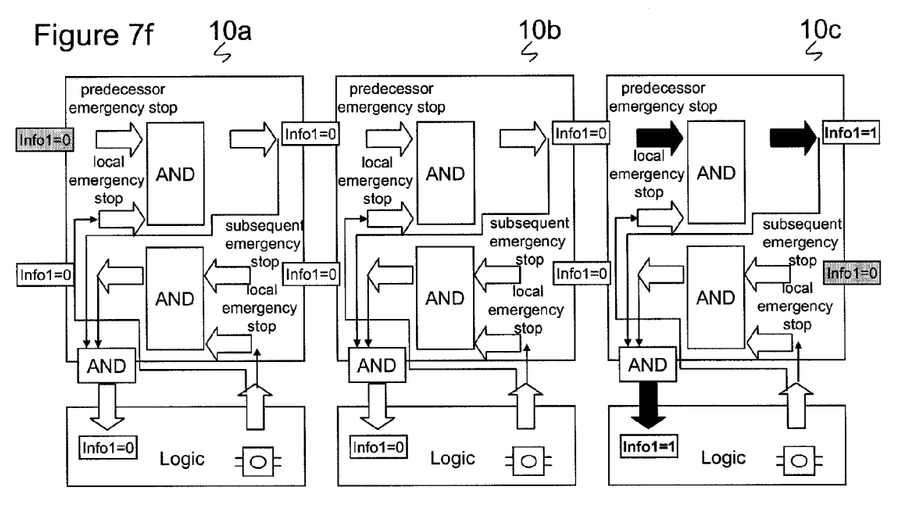

In the output state of FIG. 7a neither in the present case nor in the directly pre-running communication cycles at one of the machines an emergency stop is triggered. Correspondingly the emergency stop information is set to off, Info 1=0 everywhere.

In a first communication cycle in accordance with FIG. 7b illustrated by an exclamation mark an emergency stop is locally initiated in the machine which is monitored by a first safety controller 10a. The internal logic in the control unit 14 thus provides that the emergency stop leads to the intended shutdowns at the outputs 22. The information about the emergency stop is also provided to the predecessor and to the successor in the emergency stop information memory region Info 1, in particular provided to the dedicated bit of the global process image. Since no predecessor is connected, the information is not processed in backward direction.

In a second communication cycle in accordance with FIG. 7c the safety controller 10b receives the emergency stop signal on the dedicated bit as the successor to the safety controller 10a. The internal logic processes the emergency stop signal provides the required shutdown commands and forwards these to its own successor. This behavior also corresponds in a third communication cycle in accordance with FIG. 7d, with the information to the successor being no longer retrieved, as the safety controller 10c forms the end of the line arrangement.

Thus, all of the safety controllers 10a-c involved are informed of the information Info 1=1 that somewhere in the line arrangement a local emergency stop is active. If the local emergency stop is again deactivated at a first machine after some time, then the situation of FIG. 7e arises. The associated safety controller 10a then sets the emergency stop information, e.g. to Info 1=0, both internally and also for the line communication.

In the next communication cycle in accordance with FIG. 7f the second safety controller 10b receives this information processes it internally and forwards it. In the next communication cycle which again corresponds to FIG. 7a, all involved safety controllers 10a-c know that no local emergency stop is no longer active.

The white arrow "predecessor emergency stop" in the safety controller 10a and the white arrow "successor emergency stop" in the safety controller 10c at the ends of the line arrangement represent no information of the communication in the line arrangement, as there is no predecessor and/or no successor. This information, namely that the corresponding emergency stop signals are "Off", is a component of the already predefined information mentioned several times or the predefined default process image is used by the safety controller 10a,c at the end of the line arrangement instead of the missing neighbors. Thus, a non-existing emergency stop is not communicated from the end of the line arrangements which is correspondingly illustrated by a grey deposition, set to Info 1=0 here.

An emergency stop is an example of safety-critical information which can be initiated at each machine and which is relevant for all machines. Finally, a logical "OR" is desired, i.e. in inverted coding, an "AND" is desired, since the initiation of an emergency stop at a single machine as a rule is sufficient to stop all machines in the plant. A further example for safety-critical information is a restart following a safety-related shutdown. In this context a logical "AND" is desired, in inverted coding "OR", as the plant can only restart when no critical state is present at a single machine and therefore all machines have to acknowledge a restart. In this case the restart is initiated at one of the machines and is communicated to the neighbors. These iteratively test whether they themselves are ready for a restart and forward this message step by step up to the end of the chain, where the message is then confirmed in the successful case, runs back and leads to the actual start up of the machine.

The example of FIG. 7 is information being provided to all participating safety controllers 10 in the line arrangement. The FIGS. 8a-d illustrate these and further variants of the information processing, i.e. a few different communication possibilities in the line arrangement. In this respect the black arrows indicate a connection in which the respective communication possibility provides information. The arbitrarily selected thick bordered safety controller 10c is the starting point of the communication. An information is provided to the successor 10d in accordance with FIG. 8a, an information is provided to the successor 10b in accordance with FIG. 8b an information is provided to both neighbors in accordance with FIG. 8c and an information is provided to the overall plant 10a-e in accordance with FIG. 8d.

The information must be processed in all communication possibilities safety-technologically correctly. For this reason internal logic rules are implemented in the respective control units 14 which are shown in FIGS. 9a-d. Each communication possibility is divided into two further variants, namely one for normal coding ("Default Low") and one for inverted coding ("Default High"). In the logic rules this differences is essentially considered through the exchange of "AND"-links or of "OR"-links. These logic rules are respectively valid for a bit of the common global process image.

Figure 8A:
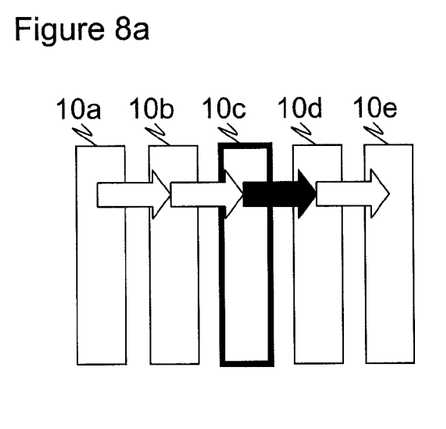
FIG. 8a a schematic illustration of a message to a successor.
Figure 8B:
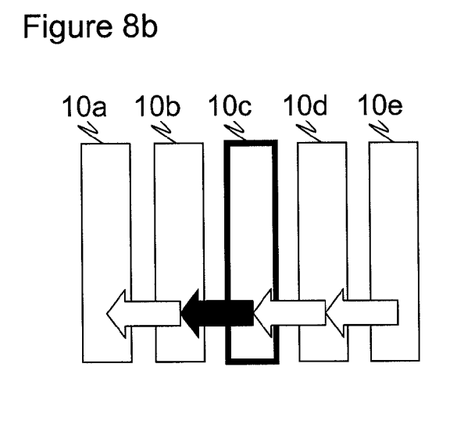
FIG. 8b a schematic illustration of a message to a predecessor.
Figure 9A:
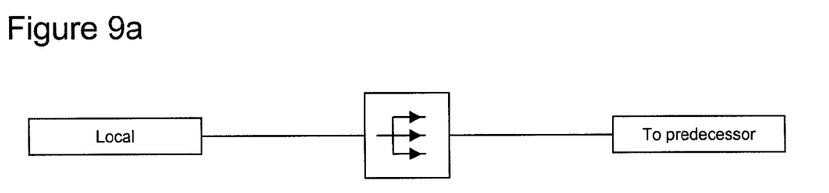
Figure 9B:
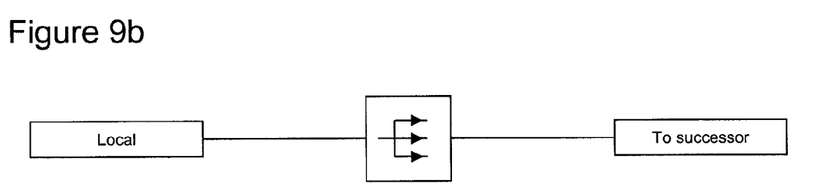
FIG. 9b a graphical representation of the logic rules for the processing of a message to a predecessor in accordance with FIG. 8B.

FIG. 9a shows the logic rules for information provided to the successor in accordance with FIG. 8a. The logic rule is very simple and includes merely a gate. Also there is no difference in the processing of normal and inverted coding information here. Analogously the logic rules of FIG. 9b apply to information being provided to the predecessor in accordance with FIG. 8b.

Figure 8C:
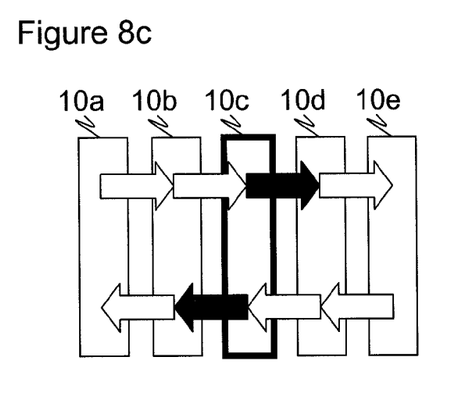
FIG. 8c a schematic illustration of a message to both neighbors.
Figure 9C:
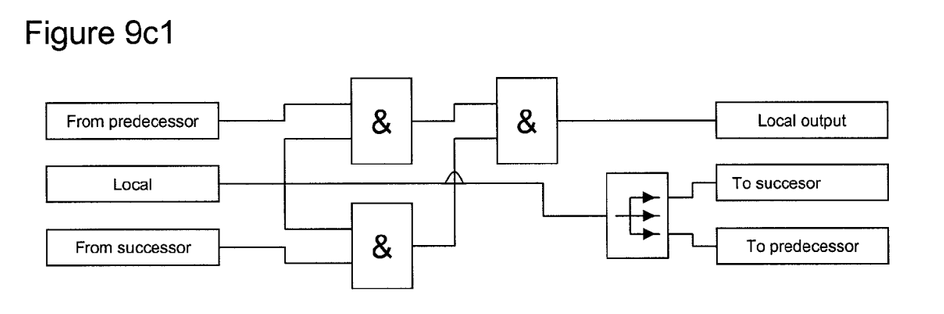
Figure 9C:
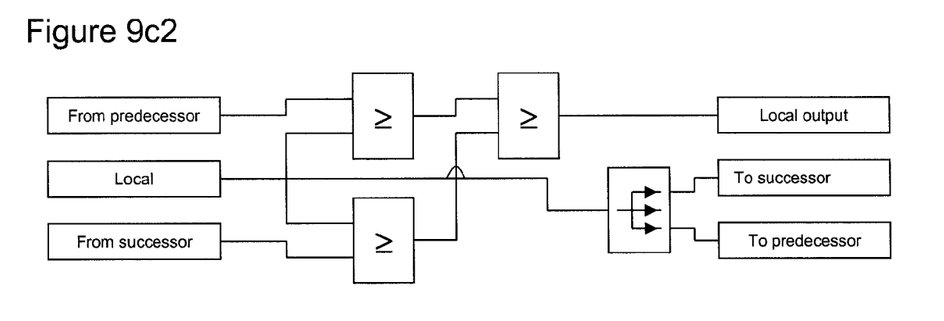

FIG. 9c shows the logic rules for information being provided to both neighbors in accordance with FIG. 8c, with FIG. 9c1 showing the case of an inverted coding ("Default High") and FIG. 9c2 showing the case of normal coding ("Default Low"). In this communication possibility information should therefore not only control information from the predecessor or from the successor, but also control the corresponding result at the local output. This is realized by corresponding pair-wise AND-links ("Default High") alternatively OR-links ("Default Low"). In addition, the local result is provided to both neighbors using a gate.

Figure 8D:
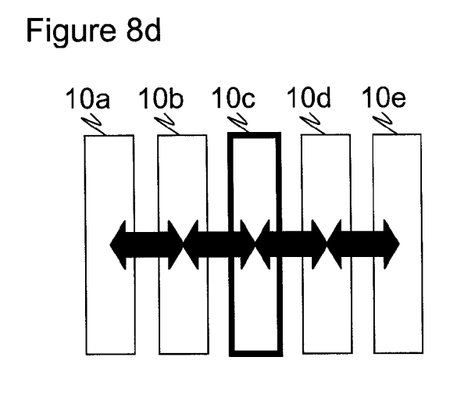
FIG. 8d a schematic illustration of a message to the overall line arrangement.
Figure 9D:
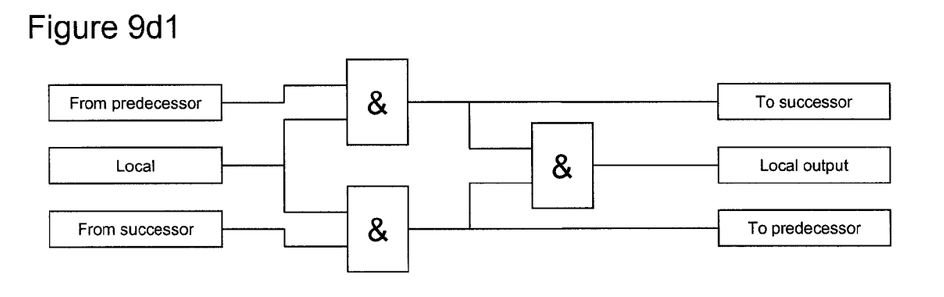
Figure 9D:
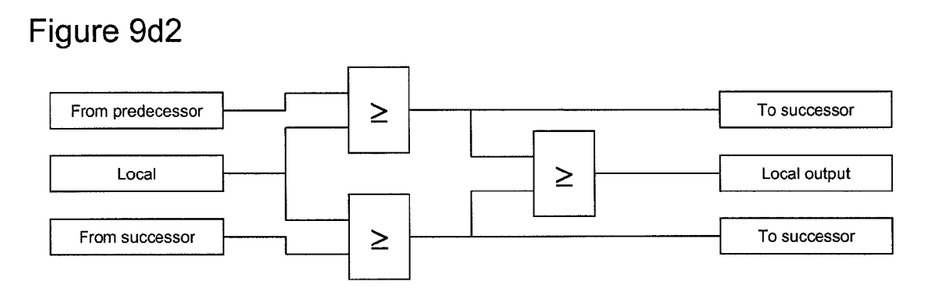

FIG. 9d shows the logic rules for information provided to the overall plant in accordance with FIG. 8d, with FIG. 9d1 showing the case of inverted coding ("Default High") and FIG. 9d2 showing the case of normal coding ("Default Low"). In this communication possibility information from the predecessor or from the successor or from a corresponding local incident should also control the local output which is also realized through a corresponding pair-wise AND-link ("Default High") alternatively OR-links ("Default Low"). Moreover, the information provided from the predecessor is forwarded to the successor and the information provided from the successor is forwarded to the predecessor to distribute information plant wide in both directions via the overall line arrangement.

The invention claimed is:

1. A safety controller for the safety monitoring of a plant, the safety controller comprising:
at least one input for connection of a sensor,
at least one output for connection of an actuator, and
a communication interface for connection of an upstream further safety controller arranged upstream and a downstream further safety controller arranged downstream in a line arrangement, and to exchange exchangeable control relevant information with the upstream further safety controller and the downstream further safety controller,
wherein the safety controller further comprises a control unit configured to execute a control program and generate a control signal to the at least one output in accordance with predeterminable logic rules in dependence on at least one of input signals from the at least one input and the exchangeable control relevant information,
wherein the control program works in self-sufficient manner within the safety controller,
wherein the exchangeable control relevant information has a global meaning defined via a line arrangement in advance and independent of communication within the line arrangement in the safety controller,
wherein the control program has logic rules to:
receive the exchangeable control relevant information from the upstream further safety controller and the downstream further safety controller in point to point communication,
internally process the exchangeable control relevant information, and
provide the result of the internal processing to the communication interface for point to point communication to the upstream safety controller and the downstream safety controller,
wherein control programs of the upstream and downstream safety controllers formed in the line arrangement compare with one another the exchangeable control relevant information upon activation of the safety controller,
wherein the exchangeable control relevant information is at least part of a pre-defined process image of the safety controller defined independently of the line arrangement in the safety controller and valid in the overall line arrangement, and
wherein the process image is not modified when adapting the plant, and all of the safety controllers, with respect to the exchangeable control relevant information, are synchronized to the same pre-defined process image.

2. The safety controller in accordance with claim 1 wherein the exchangeable control relevant information relate to safety paths.

3. The safety controller in accordance with claim 1, further comprising a memory in which values for the exchangeable control relevant information is stored.

4. The safety controller in accordance with claim 1, wherein the control programs have a respective set of logic rules to perform at least one of the following:
generate, process and forward the exchangeable control relevant information for the line arrangement, and
generate, process and forward exchangeable control relevant information for at least one of a successor safety controller and a predecessor safety controller.

5. The safety controller in accordance with claim 4 wherein the control programs have another respective set of logic rules for bits of the exchangeable control relevant information which are coded normally and coded inverted.

6. The safety controller in accordance with claim 1 wherein the communication interface is configured for a secure communication.

7. The safety controller in accordance with claim 1 which is designed modularly and has at least one connection module having at least one of the at least one input and the at least one output,
wherein a first connection module is connected to the control unit and further connection modules are each connected to only one upstream connection module so that the control unit forms a module series with the first connection module and the further connection modules.

8. The safety controller in accordance with claim 1
wherein the control unit forms a control module and connection modules,
wherein the connection modules and the control module are arranged in a housing which among the connection modules and the control module have in at least some dimensions an identical outer geometry, and
wherein each connection module has a connection for an upstream module and a connection for a downstream module of a module series.

9. The safety controller in accordance with claim 1, wherein the upstream and downstream safety controllers are connected to a predecessor safety controller and with a successor safety controller via the communication interface.

10. The safety controller in accordance with claim 9,
wherein the control units of the upstream and downstream safety controllers are configured to process a Teach-Broadcast signal so that the upstream and downstream safety controllers affiliate themselves with one another upon activation of the line arrangement, assign addresses and determine whether at least one of the predecessor safety controller and the successor safety controller is connected.

11. The safety controller in accordance with claim 9,
wherein the control programs of the upstream and downstream safety controllers of the line arrangement compare with one another whether all safety controllers of the line arrangement are in agreement with one another with regard to the exchangeable control relevant information.

12. The safety controller in accordance with claim 9,
wherein control programs of the upstream and downstream safety controllers compare the line arrangement with one another.

13. The safety controller in accordance with 9,
wherein control programs of the upstream and downstream safety controllers compare the line arrangement with one another upon activation of the safety controllers and whether the safety controllers connected to the line arrangement as at least one of predecessors and successors corresponding to their respective safety controllers.

14. A method for set-up or change of a line arrangement of safety controllers according to claim 1,
wherein the safety controllers are at least one of: connected line-wise in a desired sequence, changed in their sequence, added, or removed.

15. The method in accordance with claim 14 wherein
the control programs use a pre-determined consistent global process image and pre-defined values of the process image are stored and in the control unit when the safety controller is connected at one end of the line arrangement without a predecessor or a successor.

16. The safety controller in accordance with claim 1,
wherein the exchangeable control relevant information relate to emergency shutdown signals or to restart signals.

17. The safety controller in accordance with claim 1, further comprising:
a memory in which values for at least parts of the pre-defined process image,
wherein the control unit is configured to use the pre-defined process image as the exchangeable control relevant information of at least one of a non-connected predecessor safety controller and a successor safety controller.

18. The safety controller in accordance with claim 9,
wherein control programs of the upstream and downstream safety controllers are synchronized to the same pre-defined process image and whether the same pre-defined information is stored in all safety controllers.

* * * * *